United States Patent
Rugina et al.

(10) Patent No.: US 9,678,816 B2
(45) Date of Patent: Jun. 13, 2017

(54) SYSTEM AND METHOD FOR INJECTING FAULTS INTO CODE FOR TESTING THEREOF

(71) Applicant: VMware, Inc., Palo Alto, CA (US)

(72) Inventors: Radu Rugina, Sunnyvale, CA (US); Vivek Mohan Thampi, Sunnyvale, CA (US); Ricardo E. Gonzalez, Portola Valley, CA (US); Alok Kataria, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 560 days.

(21) Appl. No.: 13/848,231

(22) Filed: Mar. 21, 2013

(65) Prior Publication Data

US 2014/0289564 A1    Sep. 25, 2014

(51) Int. Cl.
   *G06F 11/00*    (2006.01)
   *G06F 11/07*    (2006.01)
   *G06F 11/36*    (2006.01)

(52) U.S. Cl.
   CPC ...... *G06F 11/0712* (2013.01); *G06F 11/0793* (2013.01); *G06F 11/3644* (2013.01); *G06F 11/36* (2013.01)

(58) Field of Classification Search
   CPC ... G06F 11/0712; G06F 11/0706; G06F 11/07
   USPC .......................................................... 714/41
   See application file for complete search history.

(56) References Cited

U.S. PATENT DOCUMENTS

| | | | |
|---|---|---|---|
| 5,590,332 A | 12/1996 | Baker | |
| 5,872,910 A * | 2/1999 | Kuslak et al. | ........... 714/41 |
| 6,961,927 B1 | 11/2005 | Erb et al. | |
| 7,251,810 B1 | 7/2007 | Nolte | |
| 7,735,067 B1 * | 6/2010 | Leventhal | ........... G06F 11/3636 717/127 |
| 2004/0122834 A1 | 6/2004 | Durrant et al. | |
| 2006/0168589 A1 | 7/2006 | Moore | |
| 2006/0206880 A1 | 9/2006 | Barraclough et al. | |
| 2007/0180439 A1 * | 8/2007 | Sundararajan | ...... G06F 11/3644 717/158 |
| 2008/0243969 A1 | 10/2008 | Wintergerst et al. | |
| 2008/0295095 A1 | 11/2008 | Watanabe et al. | |
| 2009/0037710 A1 | 2/2009 | Mavinakayanahalli et al. | |
| 2009/0187884 A1 | 7/2009 | Kryka et al. | |
| 2010/0287541 A1 | 11/2010 | Saunders et al. | |
| 2011/0154297 A1 | 6/2011 | Singh et al. | |

(Continued)

OTHER PUBLICATIONS

Clifford E. Cummings, Simulation and Synthesis techniques for Asynchronous FIFO Design, SNUG, San Jose, 2002.

(Continued)

*Primary Examiner* — Michael Maskulinski
*Assistant Examiner* — India Davis

(57) ABSTRACT

Probes are employed to inject errors into code. In response to a function-entry trigger event, a probe writes a predefined test value to a return value register. The probe then cause function execution to be skipped such that the test value is returned in lieu of the value which would otherwise be returned by the function. Behavior after the error is injected may then be observed, data collected, etc. such that undesired behavior (e.g., crashes) can be identified and/or corrected. In an alternative embodiment, the probe which is triggered may write a test value to a given memory address.

20 Claims, 5 Drawing Sheets

(56) References Cited

U.S. PATENT DOCUMENTS

| | | |
|---|---|---|
| 2011/0179162 A1 | 7/2011 | Mayo et al. |
| 2011/0258616 A1 | 10/2011 | Sollich |
| 2011/0296110 A1 | 12/2011 | Lilly et al. |
| 2011/0314251 A1* | 12/2011 | Godefroid ........... G06F 11/3624 711/217 |
| 2012/0084778 A1 | 4/2012 | Mall et al. |
| 2012/0159454 A1* | 6/2012 | Barham .............. G06F 9/45558 717/128 |
| 2012/0167057 A1* | 6/2012 | Schmich ............. G06F 11/3644 717/130 |
| 2012/0192283 A1 | 7/2012 | Gu et al. |
| 2013/0219408 A1 | 8/2013 | Haruki et al. |
| 2013/0326110 A1 | 12/2013 | Tsirkin et al. |
| 2014/0115394 A1 | 4/2014 | Fattah et al. |

OTHER PUBLICATIONS

Addbot, Tail call Feb. 27, 2013, Wikipedia, p. 12.
Addbot, Trampoline, Mar. 12, 2013, Wikipedia, p. 3.
Office Action dated Jun. 22, 2016 for U.S. Appl. No. 13/848,191.
WillNess, Tail Call, Aug. 24, 2011 Wikipedia pp. 1-9.
Advisory Action dated Jan. 11, 2016 for U.S. Appl. No. 13/848,191.
Final Office Action dated Dec. 23, 2016 for U.S. Appl. No. 13/848,191.

* cited by examiner

SYSTEM AND METHOD FOR INJECTING FAULTS INTO CODE FOR TESTING THEREOF

CROSS-REFERENCE TO RELATED APPLICATIONS

The present application is related to U.S. patent application Ser. No. 13/539,163 filed Jun. 29, 2012 and entitled "Simultaneous Probing of Multiple Software Modules of a Computer System"; U.S. patent application Ser. No. 13/593,463 filed Aug. 23, 2012 and entitled "Probing the Boot Sequence of a Computer System"; and U.S. patent application Ser. No. 13/848,191 filed Mar. 21, 2013 and entitled "Function Exit Instrumentation for Tail-Call Optimized Code", all of which are assigned to the same assignee as the present application.

BACKGROUND

Various tools have been developed for monitoring performance of virtualized computer systems. One such tool, known as VProbes, which is developed by VMware, Inc. of Palo Alto, California, enables administrators to "dynamically" instrument various software modules of virtual machines (VMs) running in a virtualized computer system and gather performance data relating to the instrumented software modules for analysis. The tool provides for dynamic instrumentation because code for probing software modules can be injected while the VMs are running. As a result, answers to questions such as, "Why is an application running slowly in the virtual machine?" or "Which virtual machines are consuming the majority of the I/O bandwidth?" may be explored without recompilation or downtime. Further details of VProbes are described in a user's manual available from VMware, Inc. entitled "VMware VProbes User Guide," which is incorporated by reference herein.

A probe script is employed in VProbes as a mechanism to dynamically inject code for probing software modules of VMs. The probe script defines one or more probes, each probe having a trigger and a body of code. The trigger specifies an event of interest in the instrumented software module, such as a function entry or exit point, or a periodic timer tick, and the body of code is executed when the event of interest occurs, i.e., when the probe is triggered. When such a probe script is loaded into a virtualized computer system with running VMs, it is compiled into executable code that is dynamically injected into various executing portions of the virtualized computer system.

VProbes, as described above, is safe, because it ensures through the script compiler that the state of the running virtualized computer system does not change. VProbes is also dynamic, because probes can be injected into a running virtualized computer system without recompilation or downtime of the virtualized computer system. Finally, VProbes has little or no impact on overhead, because it can be unloaded and not add to the overhead of the virtualized computer system when not in use.

SUMMARY

One or more embodiments disclosed herein provide a probing tool for virtualized computer systems that extends the benefits of VProbes. According to the embodiments, a probe executed in response to a function-entry trigger event modifies a return value of the function to a test value to simulate an error (e.g., a memory allocation failure, a disk read failure, etc.). The probe may then cause function execution to be skipped so that the test value is returned in lieu of the value which would otherwise be returned by the function. The system's behavior may then be observed in light of the simulated error. In an alternative embodiment, the probe which is triggered may simply write a test value to a given memory address to simulate the error.

A method for injecting errors into code, according to an embodiment, includes loading a probe in a selected domain, and in response to a function-entry trigger event, executing the probe which then modifies a return value of the function and causes execution of the function to be skipped.

Further embodiments of the present invention include, without limitation, a non-transitory computer-readable storage medium that includes instructions that enable a computer system to implement one or more aspects of the above methods as well as a computer system configured to implement one or more aspects of the above methods.

DETAILED DESCRIPTION

Figure 1A:
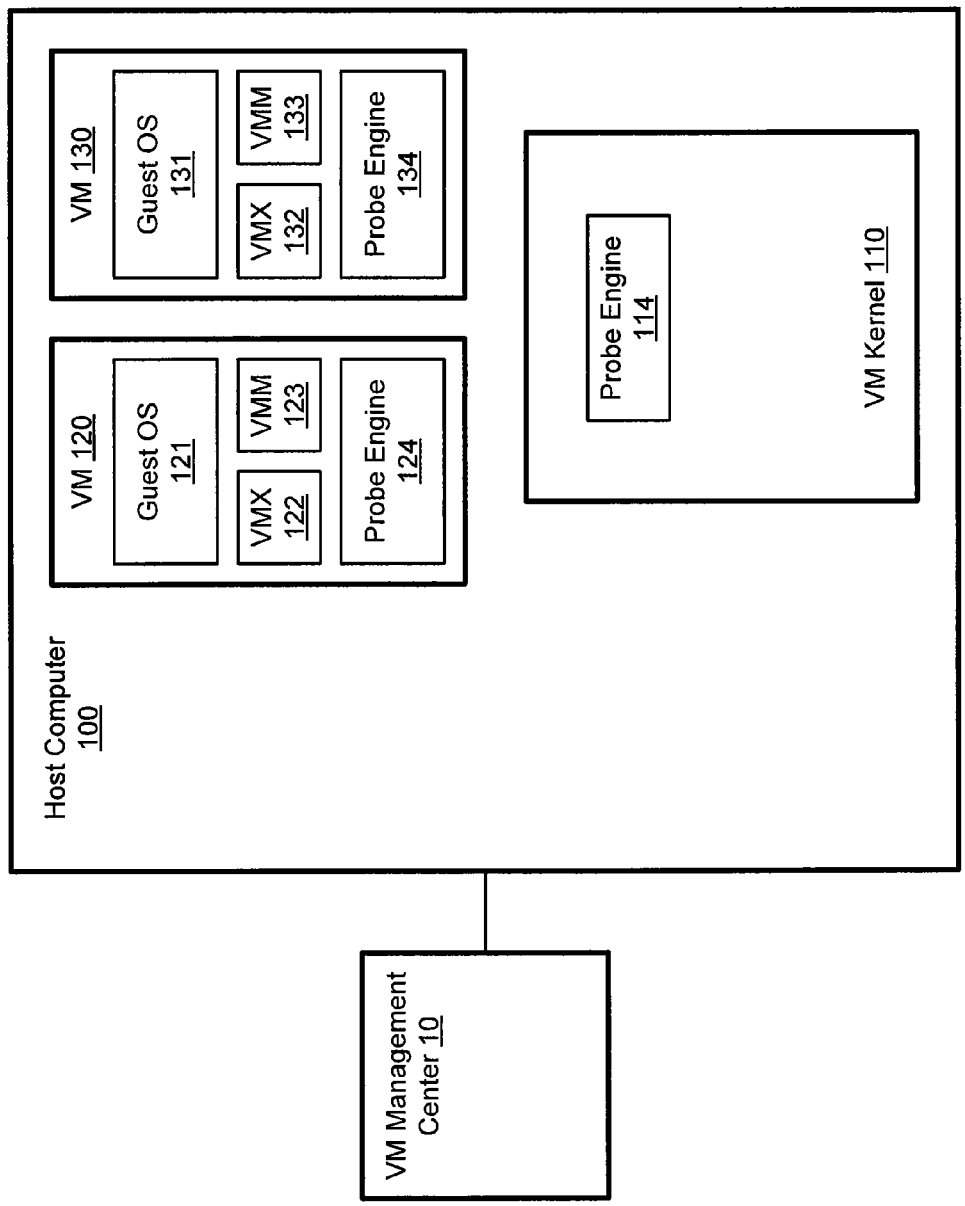
FIG. 1A is a block diagram of a computer system in which probing according to one or more embodiments may be implemented.

FIG. 1A is a block diagram of a computer system in which probing according to one or more embodiments may be implemented. The computer system, as illustrated, includes a virtual machine management center 10 for managing virtual resources, such as virtual machines (VMs) and a host computer 100 in which VMs 120, 130 are running. For purposes of illustration, two VMs are shown in FIG. 1A but it should be recognized that embodiments may be practiced with just a single VM or with more than two VMs.

VM 120 includes a guest operating system (OS) 121 that provides system software support for applications running inside VM 120, and several processes, including VMX 122 and a virtual machine monitor (VMM) 123, that run inside VM kernel (VMK) 110, which represents the kernel of system software of host computer 100. VMX 122 is a process that is responsible for handling input/output (I/O) to devices that are not critical to performance, and for communicating with user interfaces and virtual machine management center 10. It should be understood that a VMX process associated with a VM is different from a .vmx file for that VM, which stores configuration settings for that VM including configuration settings associated with VProbes, as described in the VMware VProbes User Guide. VMM 123 is responsible for virtualizing the guest OS instructions, and manages memory for the VM 120. VMM 123 also passes storage and network I/O requests to VMK 110, and all other requests to VMX 122. Similarly, VM 130 includes a guest OS 131, VMX 132, and VMM 133.

Probing in the computer system of FIG. 1A is implemented via a probe engine configured in each of VMs and VMK 110. As shown, probe engines 124, 134 are configured for VMs 120, 130, respectively, and probe engine 114 is configured for VMK 110. Each of the probe engines operates independently, except that some variables are shared among the probe engines in a manner that will be described below. Within each VM, probing may be separately enabled for (1) the guest, which includes the guest OS and the applications running on top of the guest OS, (2) the VMX, and (3) the VMM. The different targets of probing, which include the guest, the VMX, the VMM, and the VM kernel will be referred to hereinafter as the GUEST domain, the VMX domain, the VMM domain, and the VMK domain, respectively. It should be recognized that all vCPU threads are part of the VMM domain, and pCPU (physical central processing unit) threads are part of the VMK domain. As described herein, each of the probed domains, the guest, the VMX, the VMM, and the VM kernel, is a software module that runs as a separate process in the computer system.

Figure 1B:
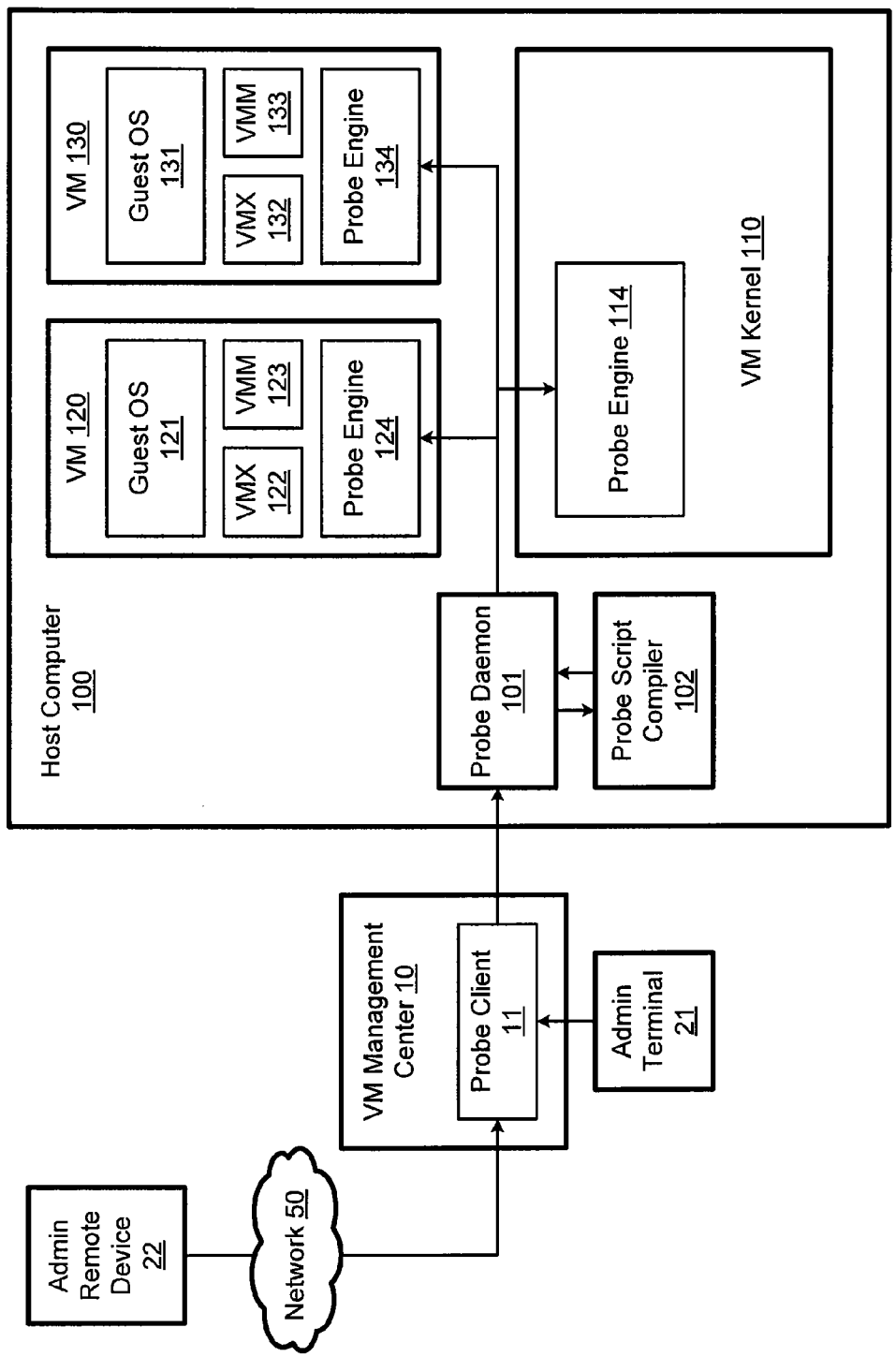
FIG. 1B illustrates a process of deploying probes in the computer system of FIG. 1A, according to an embodiment.

FIG. 1B illustrates a process of deploying probes in the computer system of FIG. 1A. In the embodiment illustrated herein, probes are deployed when a user loads a probe script into the computer system through a probe client 11 running in VM management center 10. The user may load the probe script using an administrator terminal 21 that interfaces with probe client 11 or remotely via network 50 from an administrator's remote device 22, which may be any type of computing device, such as a smartphone, a tablet computing device, laptop computer, and a desktop computer.

Once a probe script is loaded via probe client 11, the probe script is transmitted to and received by a probe daemon 101 running in host computer 100. Probe daemon 101 is responsible for coordinating the initial compilation of the probe script and extracting components for final compilation by each of probe engines 114, 124, 134. In one embodiment, probe script compiler 102 performs the initial compilation to generate a byte code for each of the different probes defined in the probe script. In one embodiment, the Emmett compiler described in the "VMware VProbes User Guide" may be used as probe script compiler 102. During typical compilation, probe script compiler 102 inserts run-time checks for infinite loops, bad pointers, and generally any portions that could cause the system to hang or crash. However, as discussed in greater detail below, faults may be injected via probes to test the system's response in various circumstances. For example, a probe may modify a function's return value, and the system's response to the modified value observed. Here, the response may well include hanging or crashing, and the compiler may permit probe code which causes such behavior.

Each of probe engines 114, 124, 134 is responsible for compiling the byte code for one or more probes received from probe daemon 101 into binary code and injecting the binary code for the probes into the targeted domain. When a probe executes in a particular domain, it has access to information specific to that domain. For example, a probe that executes in the VMM domain may have access to VMM specific information, such as the register contents of the vCPUs, whereas a probe that executes in the VMK domain may have access to register contents of the pCPUs and other VM kernel data structures.

The probe script includes one or more probes, where each probe defines a domain that it is targeting, a trigger, and a body of code. The targeted domain may be any of GUEST, VMX, VMM, and VMK. In situations where there are multiple instances of the same domain, e.g., where there are two VMs, the targeted domains will be GUEST1, GUEST2, VMX1, VMX2, VMM1, VMM2, and VMK. The trigger specifies an event of interest in the targeted domain, such as a function entry point, and the body of code is executed when the event of interest occurs.

According to one or more embodiments, probes may be employed to inject errors into code. In response to a function-entry trigger event, a probe may be executed which writes a test value to a return value register. The probe may then cause function execution to be skipped such that the test value is returned in lieu of the value which would otherwise be returned by the function. For example, a test value of null may be returned during memory allocation to simulate an out-of-memory state. Behavior after the error is injected may then be observed, data collected, etc. such that undesired behavior (e.g., crashes) can be identified and/or corrected. In an alternative embodiment, the probe which is triggered may simply write a test value to a given memory address.

Figure 2:
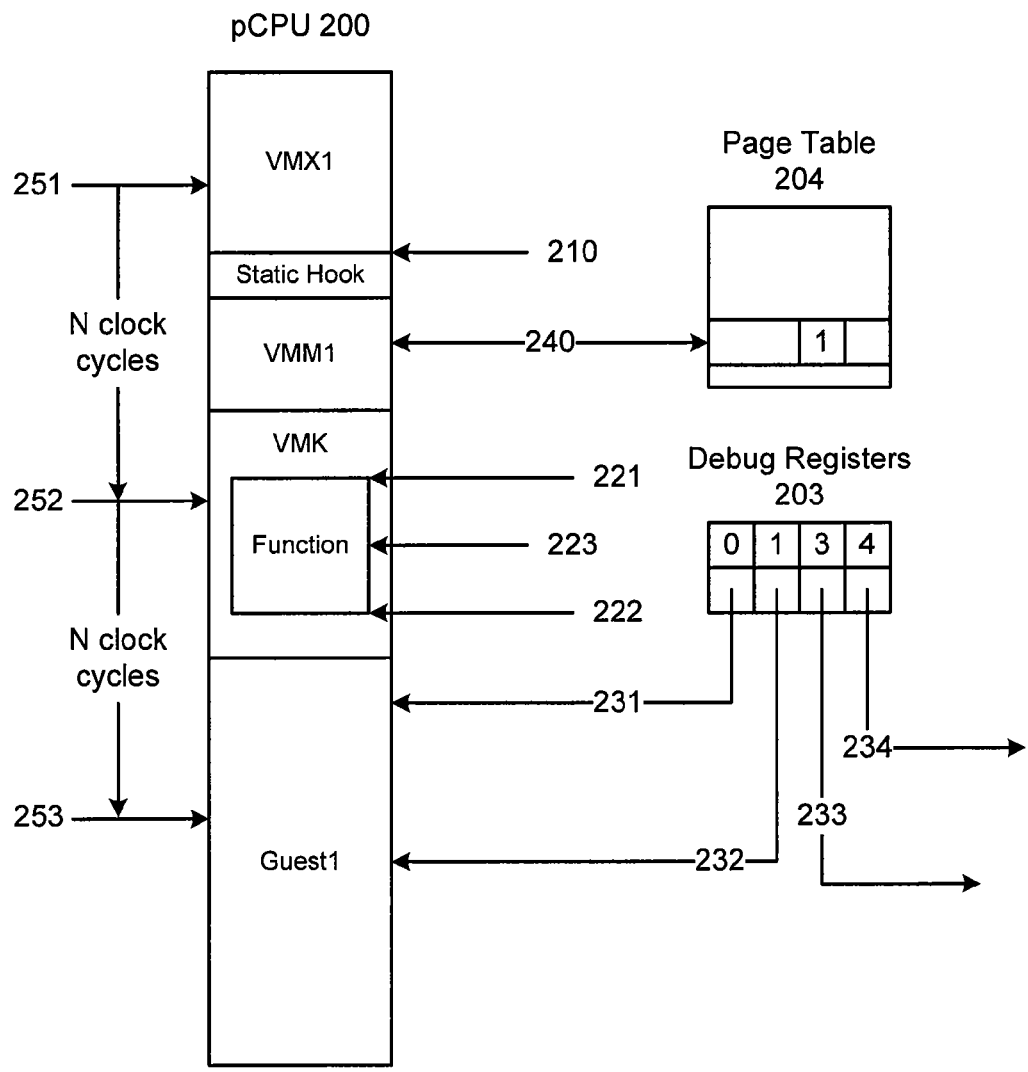
FIG. 2 is a conceptual diagram that illustrates different types of probes that can be injected into a sequence of instructions executed in a processor.

FIG. 2 is a conceptual diagram that illustrates different types of probes that can be injected into a sequence of instructions executed in a processor. In general, there are three classes of probes—static probes, dynamic probes, and periodic probes. Static probes are probes that trigger at predefined points of interest in the targeted domain, e.g., the point of transmission of a network packet or the point of delivery of an interrupt. Dynamic probes are probes that trigger at breakpoints on arbitrary instructions or watchpoints on an arbitrary piece of data. Periodic probes are probes that trigger periodically.

In the example shown in FIG. 2, processor 200 is executing a sequence of instructions, including code for the VMX domain, the VMM domain, the VMK domain, and the Guest domain. Between the code for the VMX domain and the VMM domain, a static hook is defined at point 210. A probe may be injected into this position (which is statically defined) and executed when the trigger condition for that probe is satisfied.

A probe may also be injected at various points in the sequence of instructions that may be dynamically defined by causing an exception and executing the probe as part of the exception handling routine. FIG. 2 illustrates three such examples. In the first example, int3 instruction may be inserted at the beginning of a function (point 221), at the end of a function (point 222), or at a certain byte offset from the beginning of a function (point 223). When the int3 instruction is reached, an exception is raised and a probe is executed in response thereto. In the second example, instruction addresses at various points in the sequence of instructions, e.g., 231, 232, 233, and 234, where probes are to be injected, are stored in debug registers 203, namely DR0, DR1, DR2, and DR3 registers. When any of these instruction addresses are reached, an exception is raised and a probe is executed in response thereto. In the third example, attributes of an entry of a page table 204 in system memory may be changed to cause an exception (e.g., a page fault) when an instruction (e.g., at point 240) accesses that page table entry. In this example, the exception handling for the page fault would be modified to cause execution of the probe. It should be recognized that data watchpoint probes may be implemented by altering the attributes of an entry of page table 204 corresponding to the memory location of the data being monitored. Finally, periodic probes are shown as probes 251, 252, 253 which are trigger periodically, e.g., every N clock cycles.

Figure 3:
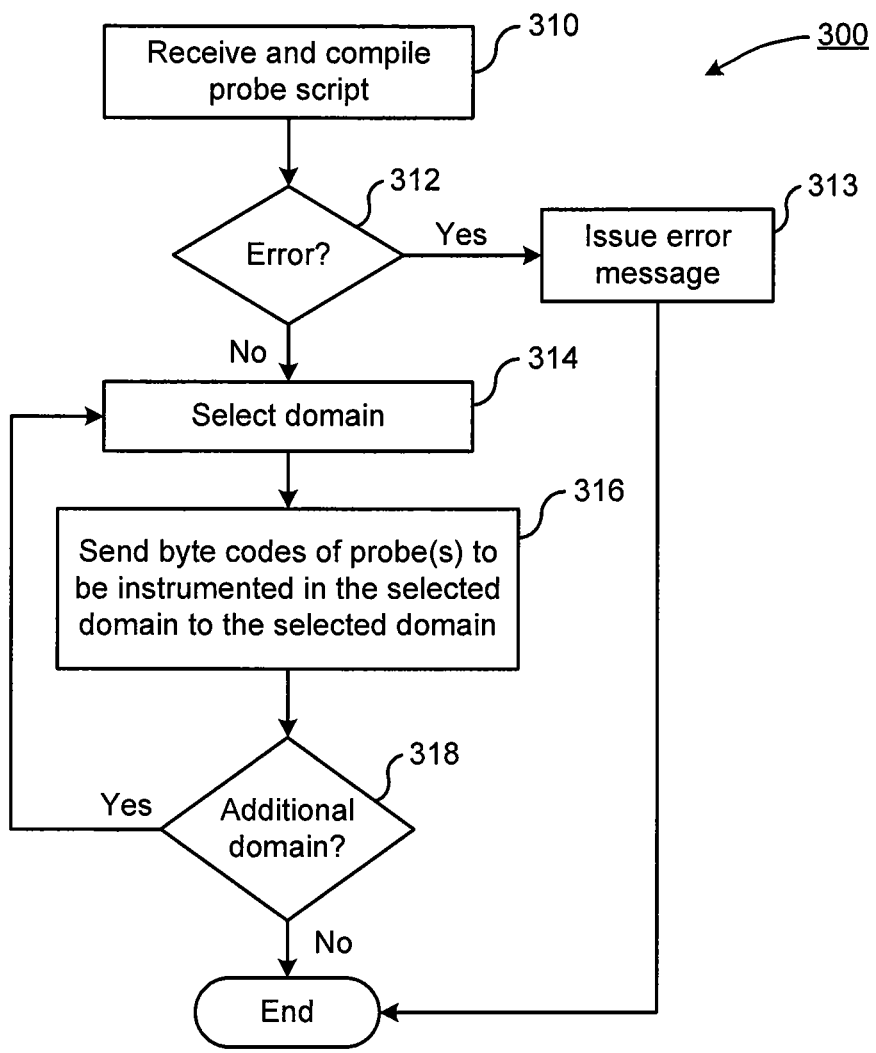
FIG. 3 is a flow diagram that illustrates a method for deploying probes in different software modules of the computer system, according to an embodiment.

FIG. 3 is a flow diagram that illustrates a method 300 for deploying probes in different software modules of the computer system. In the embodiment illustrated herein, this method is being carried out by probe daemon 101 in conjunction with probe script compiler 102. The method begins at step 310 when a probe script loaded into probe client 11 and received by probe daemon 101. In response, probe daemon 101 invokes probe script compiler 102 to compile the probe script into byte codes and insert run-time checks for infinite loops, bad pointers, and generally any portions that could cause the system to hang or crash. If it is determined at step 312 that the probe script has errors, an appropriate error message is issued to probe client 11. If there are no errors, probe daemon 101 segments the byte codes for distribution. At step 314, probe daemon 101 selects a domain as a distribution target. Then, at step 316, probe daemon 101 sends the byte code of the probe or probes to be instrumented in the selected domain to a probe engine of the selected domain (step 316). Upon receipt of the byte code, the probe engine compiles the byte code into binary code and executes the binary code. In some embodiments, probes may inject errors according to method 400, discussed below. If there are more domains to process, as determined at step 318, the method returns to step 314. If not, the method terminates.

Figure 4:
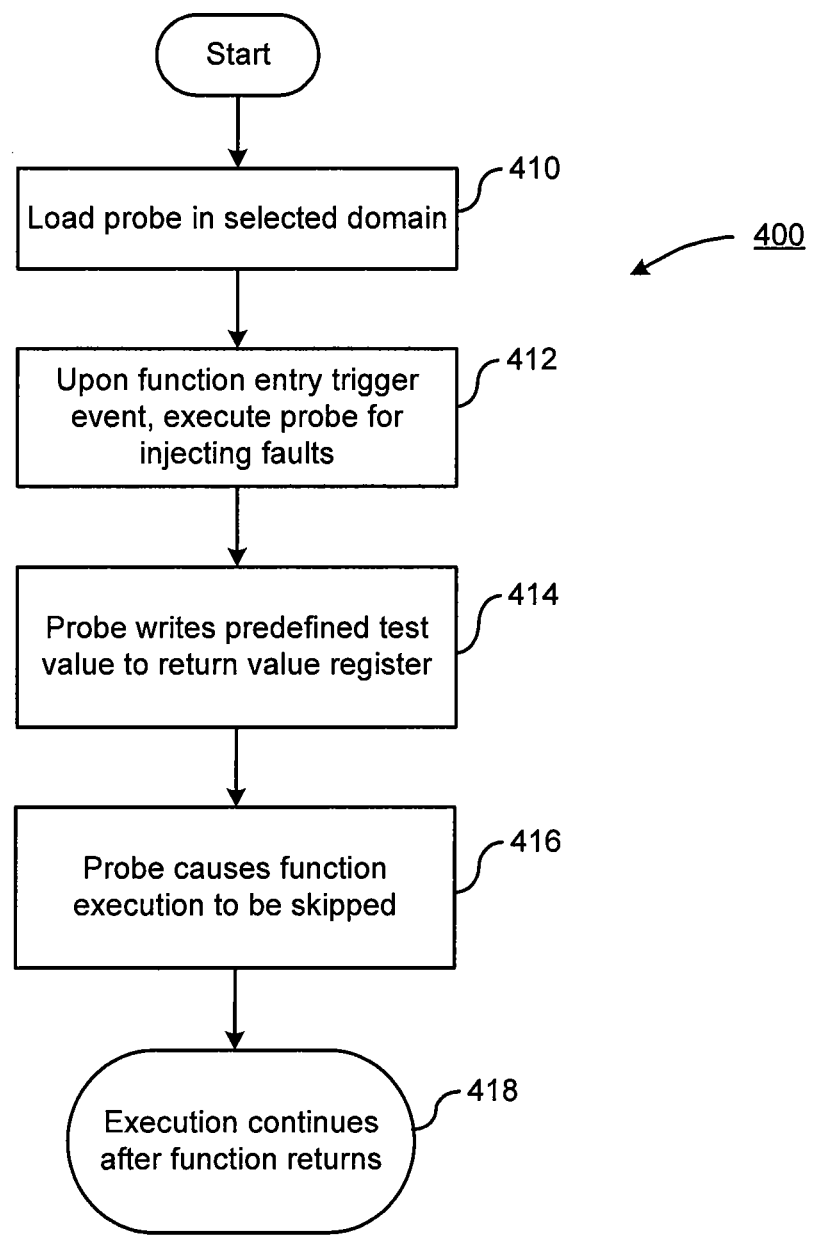
FIG. 4 is a flow diagram that illustrates a method for injecting faults into code, according to an embodiment.

FIG. 4 is a flow diagram that illustrates a method 400 for injecting faults into code, according to an embodiment. As shown, method 400 begins at step 410, where portion(s) of a probe script are loaded in a selected domain. As discussed, probe daemon 101 may segment probe script byte codes for distribution to multiple domains, and select a domain as the distribution target for each segment. In turn, a probe engine (e.g., probe engine 114, 124, 134) in the selected domain may receive byte code segment(s), compile the byte code into binary code, and execute the binary code.

At step 412, a probe executes upon a function-entry trigger event. As discussed, each probe in the probe script includes a trigger and a body of code. The trigger specifies an event of interest in the instrumented software module, and the body of code is executed when the event of interest occurs. For example, the trigger may specify that the probe fires every time the function is called, periodically (e.g., every 100 times the function is called), etc. Alternatively, instead of specifying the probe firing frequency in the trigger, a counter that is incremented each time the function is called may be set up to cause the body of code to be executed every N (e.g., 100) times.

For dynamic probes, an exception may be caused at the function entry, and the probe may be executed as part of the exception handling routine. For example, the probe engine may patch function entry addresses with debug breakpoint int3 instructions which trap to an exception handler at runtime, and in response, the exception handler may then fire the probe. Other dynamic probing techniques that are known in the art may also be used.

At step 414, the probe that is triggered writes a predefined test value to a return value register (e.g., the EAX ×86 register). Doing so permits the test value to be returned in lieu of the value which would otherwise be returned by the function. The particular test value that is used may be specified in the probe script, and may generally depend on the function being instrumented. For example, a function which allocates memory may be configured to return null when insufficient memory is available for allocation, i.e., when the system is out of memory. One probe that tests the system's response under such circumstances may write null to a return value register such that null is returned in lieu of the function's actual return value. By injecting such a fault, an out-of-memory state may be simulated even when the system has ample free memory. Of course, other errors (e.g., disk read failures) may be simulated for other functions using appropriate test return values.

At step 416, the probe causes the function to be skipped. That is, the function itself does not execute, and the test value is returned. Skipping function execution ensures that the function does not write to the return value register, thereby overwriting the test value. In addition, skipping function execution avoids any side effects resulting from its execution. In the memory allocation example referenced above, the actual memory allocation is avoided when null is returned in lieu of the memory allocation function's actual return value. Any feasible technique may be employed to skip function execution. For example, the probe may update an instruction pointer (e.g., the EIP ×86 register) to point to the function's return instruction address, thereby causing the return instruction to execute.

At step 418, normal execution continues after the function returns. A response to the test return value may then be examined. For example, after simulating a null return value during memory allocation, the system's response thereto may be observed, data collected, etc. Undesired behavior (e.g., a crash) may then be corrected by, e.g., adding to or modifying program code.

Although described above primarily with respect to modifying a function's return value, other faults may be injected in alternative embodiments. In one embodiment, a probe which is triggered may write a test value to a given memory address. The particular value(s) which are written and the particular address(es) being written to may generally depend on the desired simulation. For example, the probe may corrupt memory associated with a network packet to simulate receiving a bad packet.

Advantageously, embodiments disclosed herein permit deterministic injection of errors for testing purposes. As a result, special cases (e.g., the system being out-of-memory), which may otherwise occur infrequently, can be simulated in a controlled environment. The circumstances of the special case itself need not be reproduced.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) —CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A computer-implemented method for injecting errors into code, comprising:
    loading, via one or more processors, a probe in a selected domain; and
    in response to a function-entry trigger event, executing the probe, wherein the executed probe writes a predefined test value to a return value register of the function and causes execution of the function to be skipped and the predefined test value written to the return value register to be returned.

2. The method of claim 1, wherein the probe is a dynamic probe.

3. The method of claim 1, wherein the probe is a dynamic probe, and the function-entry is patched to trap to an exception handler which fires the probe.

4. The method of claim 1, wherein the selected domain is one of a guest operating system domain, a virtual machine (VM) domain, a VM monitor domain, and a VM kernel domain.

5. The method of claim 1, wherein the predefined test value is a value for testing a response of a system.

6. The method of claim 1, wherein the probe is further configured to write to the return value register periodically.

7. The method of claim 1, wherein the function is one of a memory allocation function and a disk read function.

8. The method of claim 1, wherein the probe is further configured to modify a value at a memory address.

9. A non-transitory computer readable storage medium comprising instructions, wherein the instructions, when executed in a computer system, cause the computer system to perform steps for injecting errors into code that include the steps of:
    loading a probe in a selected domain; and
    in response to a function-entry trigger event, executing the probe, wherein the executed probe writes a predefined test value to a return value register of the function and causes execution of the function to be skipped and the predefined test value written to the return value register to be returned.

10. The non-transitory computer readable storage medium of claim 9, wherein the probe is a dynamic probe.

11. The non-transitory computer readable storage medium of claim 9, wherein the probe is a dynamic probe, and the function-entry is patched to trap to an exception handler which fires the probe.

12. The non-transitory computer readable storage medium of claim 9, wherein the selected domain is one of a guest operating system domain, a virtual machine (VM) domain, a VM monitor domain, and a VM kernel domain.

13. The non-transitory computer readable storage medium of claim 9, wherein the predefined test value is a value for testing a response to the predefined test value.

14. The non-transitory computer readable storage medium of claim 9, wherein the probe is further configured to write to the return value register periodically.

15. The non-transitory computer readable storage medium of claim 9, wherein the function is one of a memory allocation function and a disk read function.

16. The non-transitory computer readable storage medium of claim 9, wherein the probe is further configured to modify a value at a memory address.

17. A system, comprising:
    a processor; and
    a memory, wherein the memory includes a program for injecting errors into code, the program being configured to perform operations comprising:
        loading a probe in a selected domain, and
        in response to a function-entry trigger event, executing the probe, wherein the executed probe writes a predefined test value to a return value register of the function and causes execution of the function to be skipped and the predefined test value written to the return value register to be returned.

18. The system of claim 17, wherein the probe is a dynamic probe.

19. The system of claim 17, wherein the selected domain is one of a guest operating system domain, a virtual machine (VM) domain, a VM monitor domain, and a VM kernel domain.

20. The system of claim 17, wherein the predefined test value is a value for testing a response to the predefined test value.

\* \* \* \* \*